(12) United States Patent
Tanaka

(10) Patent No.: US 8,735,489 B2
(45) Date of Patent: May 27, 2014

(54) RESIN COMPOSITE MATERIAL

(71) Applicant: Kabushiki Kaisha Toyota Chuo Kenkyusho, Nagakute (JP)

(72) Inventor: Hiromitsu Tanaka, Nagakute (JP)

(73) Assignee: Kabushiki Kaisha Toyota Chuo Kenkyusho, Nagakute (JP)

( * ) Notice: Subject to any disclaimer, the term of this patent is extended or adjusted under 35 U.S.C. 154(b) by 0 days.

(21) Appl. No.: 13/705,765

(22) Filed: Dec. 5, 2012

(65) Prior Publication Data

US 2013/0143998 A1   Jun. 6, 2013

(30) Foreign Application Priority Data

Dec. 6, 2011   (JP) ................. 2011-267228

(51) Int. Cl.
| | | |
|---|---|---|
| C08K 3/04 | (2006.01) | |
| C08K 9/00 | (2006.01) | |
| C08L 35/06 | (2006.01) | |
| C08L 25/02 | (2006.01) | |
| C08K 7/04 | (2006.01) | |
| C08K 9/04 | (2006.01) | |

(52) U.S. Cl.
CPC ............. *C08L 35/06* (2013.01); *C08L 25/02* (2013.01); *C08K 3/04* (2013.01); *C08K 7/04* (2013.01); *C08K 9/04* (2013.01)
USPC ............................ 524/496; 524/529; 523/215

(58) Field of Classification Search
CPC .......... C08L 35/06; C08L 25/02; C08K 3/04; C08K 7/04; C08K 9/04
USPC .......... 523/215; 252/511; 524/496, 529, 555, 524/548, 558
See application file for complete search history.

(56) References Cited

U.S. PATENT DOCUMENTS

| | | |
|---|---|---|
| 6,110,994 A | 8/2000 | Cooke et al. |
| 6,927,250 B2 * | 8/2005 | Kaschak et al. .............. 524/495 |
| 7,914,844 B2 | 3/2011 | Stankovich et al. |
| 2003/0180597 A1 * | 9/2003 | Sakamoto et al. ............... 429/34 |
| 2006/0035081 A1 * | 2/2006 | Morita et al. ................. 428/408 |
| 2011/0152435 A1 | 6/2011 | Morishita et al. |
| 2013/0123415 A1 * | 5/2013 | Tanaka et al. .................. 524/529 |
| 2013/0200311 A1 * | 8/2013 | Tanaka et al. .................. 252/511 |

FOREIGN PATENT DOCUMENTS

| | | |
|---|---|---|
| JP | A-10-330108 | 12/1998 |
| JP | A-2002-508422 | 3/2002 |
| JP | A-2003-012311 | 1/2003 |
| JP | A-2004-134515 | 4/2004 |
| JP | A-2005-053773 | 3/2005 |
| JP | A-2005-320220 | 11/2005 |
| JP | A-2006-233017 | 9/2006 |
| JP | A-2009-144000 | 7/2009 |
| JP | A-2010-037537 | 2/2010 |
| JP | A-2010-100837 | 5/2010 |
| WO | WO 02/01660 A1 | 1/2002 |
| WO | WO 2009/075322 A1 | 6/2009 |
| WO | WO 2011/155486 A1 | 12/2011 |
| WO | WO 2011/155487 A1 | 12/2011 |

OTHER PUBLICATIONS

Office Action dated Oct. 21, 2013 issued in Japanese Patent Application No. JP-2011-021562.
Zhang et al., "Flammability and thermal stability studies of styrene-butyl acrylate copolymer/graphite oxide nanocomposite," Polymer Degradation and Stability, vol. 85 (2004), pp. 583-588.
Japanese Office Action dated Dec. 25, 2013 issued in Japanese Patent Application No. 2011-127081 (with translation).
Japanese Office Action dated Dec. 27, 2013 issued in Japanese Patent Application No. 2011-267228 (with translation).

* cited by examiner

*Primary Examiner* — Hannah Pak
(74) *Attorney, Agent, or Firm* — Oliff PLC

(57) ABSTRACT

A resin composite material including fine graphite particles including plate-like graphite particles, an aromatic vinyl copolymer which is adsorbed on the plate-like graphite particles and which has a vinyl aromatic monomer unit represented by the following formula: —($CH_2$—CHX)— (X represents a phenyl group, a naphthyl group, an anthracenyl group, or a pyrenyl group, provided that these groups may have substituents); a fibrous inorganic filler; and a resin matrix.

8 Claims, 2 Drawing Sheets

RESIN COMPOSITE MATERIAL

BACKGROUND OF THE INVENTION

1. Field of the Invention

The present invention relates to a resin composite material comprising graphite particles.

2. Related Background Art

Conventionally, addition of various fillers to a resin has been studied for imparting characteristics of the filler to the resin. For example, graphite particles are a filler excellent in heat resistance, chemical resistance, mechanical strength, thermal conductivity, electrical conductivity, and the like, and it is known that characteristics of graphite particles can be imparted to a resin by adding the graphite particles to the resin. However, graphite particles are likely to aggregate, and moreover have low affinity for resins. Hence, graphite particles are dispersed in a resin in an aggregated state. Therefore, it is difficult to cause characteristics of graphite particles to be expressed sufficiently. Moreover, there is a problem that when a large amount of graphite particles are added for sufficient expression of characteristics of graphite particles, a resultant molded article becomes hard and brittle.

In this respect, the following methods are proposed as methods for highly dispersing graphite particles in a resin: a method in which a surface of a carbon filler such as graphite is modified with a carboxylic acid ester to change the properties of the surface, and then the modified carbon filler is added to a polymer (for example, International Application Japanese-Phase Publication No. 2002-508422); and a method in which a graphite oxide having organic onium ions intercalated therein is melt kneaded with a thermoplastic resin (Japanese Unexamined Patent Application Publication No. 2006-233017). However, when graphite particles are subjected to a surface modification treatment as described above, the characteristics (in particular, electrical conductivity) of the graphite particles tend to be impaired. For this reason, although the graphite particles are highly dispersed in the resin, the characteristics of the graphite particles are insufficiently imparted to the resin.

Moreover, Japanese Unexamined Patent Application Publication No. 2009-144000 proposes a resin composite material having a reduced amount of graphite particles. The resin composite material comprises a carbon fiber and a graphite powder at a specific ratio. It is also disclosed that this resin composite material is excellent in heat dissipation capability, electrical conductivity, impact resistance, and the like. However, such a resin composite material still does not have sufficiently high thermal conductivity or elastic modulus.

SUMMARY OF THE INVENTION

The present invention has been made in view of the above-described problems of the conventional technologies, and an object of the present invention is to provide a resin composite material having excellent thermal conductivity and high elastic modulus.

The present inventors have conducted earnest study to achieve the above object. As a result, the present inventors have found that excellent thermal conductivity and high elastic modulus can be imparted to a resin matrix by adding, to the resin matrix, a combination of a fibrous inorganic filler with fine graphite particles which are obtained by mixing graphite particles, a specific aromatic vinyl copolymer, and a peroxyhydrate, and subjecting the mixture to a grinding treatment. This finding has led to the completion of the present invention.

Specifically, a resin composite material of the present invention comprises:
fine graphite particles comprising
plate-like graphite particles, and
an aromatic vinyl copolymer which is adsorbed on the plate-like graphite particles and which contains a vinyl aromatic monomer unit represented by the following formula (1):

(in the formula (1), X represents a phenyl group, a naphthyl group, an anthracenyl group, or a pyrenyl group, provided that these groups may have each a substituent);
a fibrous inorganic filler; and
a resin matrix.

In such a resin composite material, the plate-like graphite particle preferably has a thickness of 0.3 to 1000 nm. Moreover, the fine graphite particles are preferably obtained by subjecting graphite particles to a grinding treatment in the presence of a peroxyhydrate and the aromatic vinyl copolymer.

In addition, in the resin composite material of the present invention, the fibrous inorganic filler is preferably at least one selected from the group consisting of carbon nanotubes, carbon fibers, silicon carbide whiskers, and alumina fibers. The fibrous filler preferably has an average fiber length of 0.1 to 100 μm, and the fibrous filler preferably has an average fiber diameter of 0.3 to 1000 nm.

In such a resin composite material, an amount of the fine graphite particles is preferably 0.1 to 90% by mass, an amount of the fibrous inorganic filler is preferably 0.1 to 50% by mass, and a total amount of the fine graphite particles and the fibrous inorganic filler is preferably 0.2 to 95% by mass, relative to the entire resin composite material.

Note that although it is not exactly clear why the resin composite material of the present invention has a high elastic modulus, the present inventors presume as follows. Specifically, since the aromatic vinyl copolymer is adsorbed on the surface of the fine plate-like graphite particle in the fine graphite particle according to the present invention, the cohesive force between the plate-like graphite particles is reduced. In addition, the monomer unit which constitutes the aromatic vinyl copolymer and which is other than the vinyl aromatic monomer unit exhibits affinity for the resin matrix. Presumably because of these reasons, the fine graphite particles are successfully dispersed in the resin matrix. Moreover, it is presumed that since the vinyl aromatic monomer unit has a stable ability to adsorb on the plate-like graphite particles, the dispersion stability of the fine graphite particles is also improved. It is presumed that since the fine graphite particles are dispersed in the resin matrix as described above, the resin composite material of the present invention exhibits a high elastic modulus.

Further, although it is not exactly clear why the thermal conductivity and the electrical conductivity of the resin composite material are improved by using the fine graphite particles according to the present invention and the fibrous inorganic filler in combination, the present inventors presume as follows. Specifically, it is presumed that since the fine graphite particles according to the present invention are plate like, the fine graphite particles dispersed in the resin matrix are oriented in parallel with each other due to the flow of the dispersion liquid during molding or the like. In the case where such fine graphite particles alone are added to a resin matrix, although the internal thermal resistance and the internal electrical resistance of such fine graphite particles are small, thermal resistance and electrical resistance occur because of the following reason. Specifically, since the fine graphite particles are oriented in parallel with each other, the probability of contact of the fine graphite particles with each other is small, and hence heat transfer and electron transfer are less likely to occur between the fine graphite particles. Presumably for this reason, it is difficult to improve the thermal conductivity and the electrical conductivity of a resin composite material in which fine graphite particles alone are blended as the filler.

Meanwhile, when a fibrous inorganic filler alone is added to a resin matrix, a thermal conduction path and an electrical conduction path are formed, because pieces of the fibrous inorganic filler 2 are in contact with each other in the resin matrix 3 as shown in FIG. 2. However, it is presumed that since the cross-sectional areas of the thermal conduction path and the electrical conduction path in the fiber axial direction are small, the internal resistance of the fibrous inorganic filler 2 is large. In addition, it is presumed that since many boundaries between grains of the fibrous inorganic filler 2 are present, a large grain boundary resistance develops. Presumably as a result, it is difficult to improve the thermal conductivity and the electrical conductivity of a resin composite material in which a fibrous inorganic filler alone is blended as the filler.

In contrast, the fine graphite particles according to the present invention and the fibrous inorganic filler are used in combination in the resin composite material of the present invention. Hence, it is presumed that a structure as shown in FIG. 1 in which the fine graphite particles 1 oriented in parallel with each other are linked to each other by the fibrous inorganic filler 2 is formed in a resin matrix 3. In such a structure, the fibrous inorganic filler 2 presumably serves as a thermal conduction path and an electrical conduction path between the fine graphite particles 1, and reduces the thermal resistance and the electrical resistance between the fine graphite particles 1. Moreover, the cross-sectional areas of the thermal conduction path and the electrical conduction path in the plate-like graphite particles are larger in the fine graphite particles 1 than in the fibrous inorganic filler 2, and few defects are present in the graphite structure in the plate-like graphite particles. Hence, the resistances are so small that heat and electricity readily flow through the plate-like graphite particles. Because of this, the fine graphite particles 1 function well as a thermal conduction path and an electrical conduction path. Besides, heat and electricity are transferred through the fine graphite particles 1, the number of passages through boundaries between grains of the fibrous inorganic filler 2 is reduced, so that the boundary resistance between grains of the fibrous inorganic filler 2 is reduced. Presumably as a result, the thermal conductivity and the electrical conductivity of the resin composite material of the present invention are remarkably improved.

According to the present invention, it is possible to obtain a resin composite material having excellent thermal conductivity and high elastic modulus.

DETAILED DESCRIPTION OF THE PREFERRED EMBODIMENTS

Figure 1:
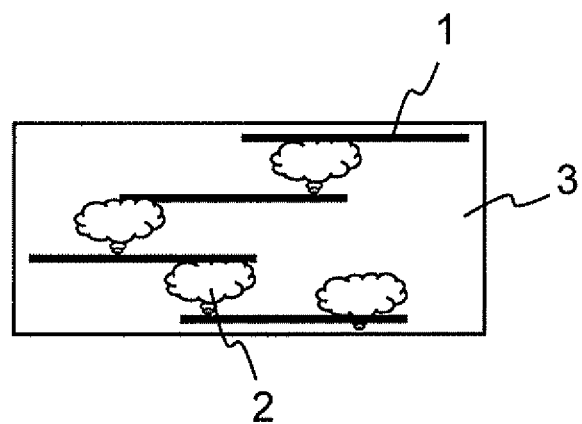
FIG. 1 is a schematic diagram showing a structure of a resin composite material of the present invention.
Figure 2:
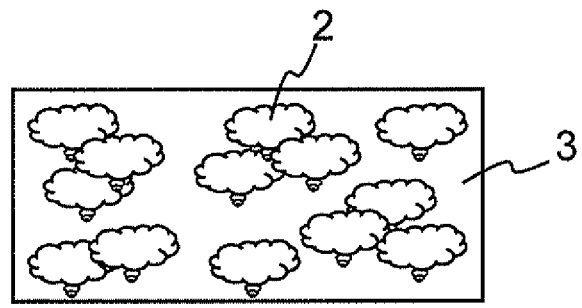
FIG. 2 is a schematic diagram showing a structure of a composite material of a fibrous inorganic filler and a resin.

Hereinafter, the present invention will be described in detail on the basis of preferred embodiments thereof.

A resin composite material of the present invention comprises: fine graphite particles comprising plate-like graphite particles and a specific aromatic vinyl copolymer adsorbed on the plate-like graphite particles; a fibrous inorganic filler; and a resin matrix. In such a resin composite material, the fine graphite particles are preferably dispersed in the resin matrix. In such a case, the resultant resin composite material has high elastic moduli (storage elastic modulus and loss elastic modulus). Moreover, the fibrous inorganic filler is preferably in contact with the plural fine graphite particles dispersed in the resin matrix. In such a case, the plural fine graphite particles in the dispersed state take a state of being linked to each other through the fibrous inorganic filler, so that a thermal conduction path is formed in the resin matrix, and the thermal conductivity of the resin composite material is improved.

<Fine Graphite Particles>

First, the fine graphite particles according to the present invention are described. The fine graphite particles according to the present invention comprise plate-like graphite particles, and an aromatic vinyl copolymer adsorbed on the plate-like graphite particles.

The plate-like graphite particles are not particularly limited, but examples thereof include those obtained by grinding known graphite having a graphite structure (synthetic graphite or natural graphite (for example, flake graphite, vein graphite, or amorphous graphite)), while avoiding destruction of the graphite structure.

The thickness of the plate-like graphite particle is not particularly limited, but is preferably 0.3 to 1000 nm, more preferably 0.3 to 100 nm, and particularly preferably 1 to 100 nm. Meanwhile, the size of the plate-like graphite particle in the plane direction is not particularly limited, but, for example, the length in the major axis direction (longest diameter) is preferably 0.1 to 500 μm, and more preferably 1 to 500 μm, while the length in the minor axis direction (shortest diameter) is preferably 0.1 to 500 μm, and more preferably 0.3 to 100 μm.

Moreover, a functional group such as hydroxyl group, carboxyl group, or epoxy group is preferably bonded (more preferably covalently bonded) to a surface of the plate-like graphite particle according to the present invention. The functional group has affinity for the aromatic vinyl copolymer according to the present invention, and increases the amount and the adsorption force of the aromatic vinyl copolymer adsorbed on the plate-like graphite particles, so that the dispersibility of the fine graphite particles in the resin matrix tends to increase.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. On the other hand, the lower limit of the ratio of the carbon atoms to which the functional group is bonded is not particularly limited, but is preferably 0.01% or higher. Note that the functional group such as hydroxyl group can be quantitatively measured by the X-ray photoelectron spectroscopy (XPS), and the amount of the functional group present in a region from a particle surface to a depth of 10 nm can be determined. Here, when the thickness of a plate-like graphite particle is 10 nm or less, the amount of the functional group present in the entire region of the plate-like graphite particle is measured.

The aromatic vinyl copolymer according to the present invention contains a vinyl aromatic monomer unit represented by the following formula (1):

$$—(CH_2—CHX)—  \qquad (1)$$

(in the formula (1), X represents a phenyl group, a naphthyl group, an anthracenyl group, or a pyrenyl group, provided that these groups may have each a substituent), and another monomer unit. Moreover, in the present invention, a copolymer obtained by copolymerization of still another vinyl monomer with such an aromatic vinyl copolymer can also be used as the aromatic vinyl copolymer according to the present invention.

In such an aromatic vinyl copolymer, the vinyl aromatic monomer unit exhibits an ability to adsorb on the graphite particles, and the other monomer unit exhibits affinity for the resin matrix according to the present invention, solvents, or the functional group present near the surface of the graphite particle. Hence, such an aromatic vinyl copolymer reduces the cohesive force between the plate-like graphite particles by adsorbing onto the plate-like graphite particles, and also imparts affinity for the resin matrix according to the present invention or solvents to the plate-like graphite particles, so that the plate-like graphite particles can be highly dispersed in the resin matrix according to the present invention or a solvent.

Moreover, since the vinyl aromatic monomer unit easily adsorbs on the graphite particles as described above, a copolymer having a higher content of the vinyl aromatic monomer unit is adsorbed in a larger amount on the plate-like graphite particles, so that the dispersibility of the fine graphite particles in the resin matrix according to the present invention or a solvent tend to be increased. The amount of the vinyl aromatic monomer unit is preferably 10 to 98% by mass, more preferably 30 to 98% by mass, and particularly preferably 50 to 95% by mass, relative to the entire aromatic vinyl copolymer. If the amount of the vinyl aromatic monomer unit is less than the lower limit, the amount of the aromatic vinyl copolymer adsorbed on the plate-like graphite particles decreases, so that the dispersibility of the fine graphite particles tends to be lowered. If the amount of the vinyl aromatic monomer unit exceeds the upper limit, the affinity for the resin matrix according to the present invention is not imparted to the plate-like graphite particles, so that the dispersibility of the fine graphite particles tends to be lowered.

Examples of the substituent which the group represented by X in the above-described formula (1) may have include alkoxy groups (for example, a methoxy group), a carbonyl group, amide groups, imide groups, a carboxyl group, carboxylic acid ester groups, phosphate ester groups, and the like. Of these substituents, alkoxy groups such as a methoxy group are preferable, and a methoxy group is more preferable from the viewpoint that the dispersibility of the fine graphite particles is improved.

Examples of the vinyl aromatic monomer unit include a styrene monomer unit, a vinylnaphthalene monomer unit, a vinylanthracene monomer unit, a vinylpyrene monomer unit, a vinylanisole monomer unit, a vinylbenzoic acid ester monomer unit, an acetyistyrene monomer unit, and the like. Of these vinyl aromatic monomer units, a styrene monomer unit, a vinylnaphthalene monomer unit, and a vinylanisole monomer unit are preferable from the viewpoint that the dispersibility of the fine graphite particles is improved.

The other monomer unit constituting the aromatic vinyl copolymer according to the present invention is not particularly limited, but is more preferably a monomer unit derived from at least one monomer selected from the group consisting of (meth)acrylic acid, (meth)acrylates, (meth)acrylamides, vinylimidazoles, vinylpyridines, maleic anhydride, and maleimides. The use of such an aromatic vinyl copolymer containing the other monomer unit improves the affinity of the fine graphite particles for the resin matrix according to the present invention and solvents, thereby making it possible to highly disperse the fine graphite particles in the resin matrix according to the present invention or a solvent.

Examples of the (meth)acrylates include alkyl(meth)acrylates, substituted alkyl(meth)acrylates (for example, hydroxyalkyl(meth)acrylates such as hydroxyethyl(meth)acrylate and aminoalkyl(meth)acrylates such as dimethylaminoethyl(meth)acrylate), and the like. Examples of the (meth)acrylamides include (meth)acrylamide, N-alkyl(meth)acrylamides, N,N-dialkyl(meth)acrylamides (for example, N,N-dimethyl(meth)acrylamide), and the like.

Examples of the vinylimidazoles include 1-vinylimidazole and the like. Examples of the vinylpyridines include 2-vinylpyridine, 4-vinylpyridine, and the like. Examples of the maleimides include maleimide, alkylmaleimides (for example, methylmaleimide and ethylmaleimide), arylmaleimides (for example, phenylmaleimide), and the like.

Of these other monomers, alkyl(meth)acrylates, hydroxyalkyl(meth)acrylates, aminoalkyl(meth)acrylates, N,N-dialkyl(meth)acrylamides, 2-vinylpyridine, 4-vinylpyridine, and arylmaleimides are preferable, hydroxyalkyl(meth)acrylates, N,N-dialkyl(meth)acrylamides, 2-vinylpyridine, and arylmaleimides are more preferable, and phenylmaleimide is particularly preferable from the viewpoint that the dispersibility of the fine graphite particles is improved.

The number average molecular weight of the aromatic vinyl copolymer in the fine graphite particles according to the present invention is not particularly limited, but is preferably 1000 to 1000000, and more preferably 5000 to 100000. If the number average molecular weight of the aromatic vinyl copolymer is less than the lower limit, the adsorption capability on the graphite particles tends to decrease. Meanwhile, if the number average molecular weight of the aromatic vinyl copolymer exceeds the upper limit, the handling tends to be difficult, because the solubility in a solvent decreases, or the viscosity remarkably increases. Note that the number average molecular weight of the aromatic vinyl copolymer is a value measured by gel permeation chromatography (column: Shodex GPC K-805L and Shodex GPC K-800RL (both manufactured by Showa Denko K. K.), eluent: chloroform), and converted by using standard polystyrene.

In addition, a random copolymer or a block copolymer may be used as the aromatic vinyl copolymer in the fine graphite particles according to the present invention. From the viewpoint that the dispersibility of the fine graphite particles is improved, a block copolymer is preferably used.

The amount of the aromatic vinyl copolymer in the fine graphite particles according to the present invention is preferably $10^{-7}$ to $10^{-1}$ parts by mass, and more preferably $10^{-5}$ to $10^{-2}$ parts by mass, relative to 100 parts by mass of the plate-like graphite particles. If the amount of the aromatic vinyl copolymer is less than the lower limit, the dispersibility of the fine graphite particles tends to be lowered, because the aromatic vinyl copolymer is adsorbed insufficiently on the plate-like graphite particles. Meanwhile, if the amount of the aromatic vinyl copolymer exceeds the upper limit, part of the aromatic vinyl copolymer tends to be present without direct adsorption on the plate-like graphite particles.

As described above, the fine graphite particles according to the present invention have a high affinity for the resin matrix according to the present invention, and are highly dispersed in the resin matrix in the resin composite material of the present invention. In addition, the fine graphite particles have an excellent dispersibility in a solvent. For example, when the resin composite material of the present invention is produced by mixing the resin matrix and the fine graphite particles according to the present invention in a solvent as described later, the fine graphite particles can be easily and highly dispersed in the solvent, and the resin composite material of the present invention can be easily obtained in which the fine graphite particles are uniformly dispersed in the resin matrix.

Next, a method for producing the fine graphite particles according to the present invention is described. The fine graphite particles according to the present invention can be produced by mixing graphite particles, which are a raw material, the aromatic vinyl copolymer having the vinyl aromatic monomer unit represented by the above-described formula (1), a peroxyhydrate, and a solvent, subjecting the obtained mixture to a grinding treatment, and then removing the solvent.

Examples of the graphite particles (hereinafter, referred to as "raw material graphite particles") used as a raw material for production of the fine graphite particles according to the present invention include known graphite having a graphite structure (synthetic graphite and natural graphite (for example, flake graphite, vein graphite, and amorphous graphite)). In particular, preferred are those from which plate-like graphite particles having the thickness in the above-described range can be obtained by grinding. Examples of the raw material graphite particles include aggregates (secondary particles) of the plate-like graphite particles (primary particles). Moreover, the particle diameter of such raw material graphite particle is not particularly limited, but is preferably 0.01 to 5 mm, and more preferably 0.1 to 1 mm.

Moreover, it is preferable that a functional group such as hydroxyl group, carboxyl group, or epoxy group be bonded (more preferably covalently bonded) to each surface of the plate-like graphite particles constituting the raw material graphite particles. The functional group has affinity for the aromatic vinyl copolymer, and increases the amount and the adsorption force of the aromatic vinyl copolymer adsorbed on the plate-like graphite particles. As a result, the obtained fine graphite particles tend to have a high dispersibility in the resin matrix according to the present invention.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. Meanwhile, the lower limit of the ratio of the carbon atoms to which the functional group is bonded is not particularly limited, but is preferably 0.01% or higher.

Examples of the peroxyhydrate used for producing the fine graphite particles include complexes of hydrogen peroxide with a compound having a carbonyl group (for example, urea, a carboxylic acid (benzoic acid, salicylic acid, or the like), a ketone (acetone, methyl ethyl ketone, or the like), or a carboxylic acid ester(methyl benzoate, ethyl salicylate, or the like)); those in which hydrogen peroxide is coordinated to a compound such as a quaternary ammonium salt, potassium fluoride, rubidium carbonate, phosphoric acid, or uric acid; and the like. Such a peroxyhydrate acts as an oxidizing agent in the production of the fine graphite particles according to the present invention, and facilitates the exfoliation of carbon layers, without destruction of the graphite structure of the raw material graphite particles. In other words, the peroxyhydrate is intercalated between carbon layers, and causes the cleavage to proceed, while oxidizing the surfaces of the layers. Simultaneously, the aromatic vinyl copolymer is intercalated between the cleaved carbon layers to stabilize the cleavage surfaces. Thus, the interlayer exfoliation is promoted. Consequently, the aromatic vinyl copolymer is adsorbed on the surfaces of the plate-like graphite particles, making it possible to highly disperse the fine graphite particles in the resin matrix according to the present invention.

The solvent used for producing the fine graphite particles is not particularly limited, but preferred are dimethylformamide (DMF), chloroform, dichloromethane, chlorobenzene, dichlorobenzene, N-methylpyrrolidone (NMP), hexane, toluene, dioxane, propanol, γ-picoline, acetonitrile, dimethyl sulfoxide (DMSO), and dimethylacetamide (DMAC), and more preferred are dimethylformamide (DMF), chloroform, dichloromethane, chlorobenzene, dichlorobenzene, N-methylpyrrolidone (NMP), hexane, and toluene.

In the production of the fine graphite particles according to the present invention, first, the raw material graphite particles, the aromatic vinyl copolymer, the peroxyhydrate, and the solvent are mixed. The amount of the raw material graphite particles mixed per liter of the solvent is preferably 0.1 to 500 g/L, and more preferably 10 to 200 g/L. If the amount of the raw material graphite particles mixed is less than the lower limit, such an amount tends to be economically disadvantageous, because the amount of the solvent consumed increases. Meanwhile, if the amount of the raw material graphite particles mixed exceeds the upper limit, handling of the liquid tends to be difficult, because the viscosity of the liquid increases.

Meanwhile, the amount of the aromatic vinyl copolymer mixed is preferably 0.1 to 1000 parts by mass, and more preferably 0.1 to 200 parts by mass, relative to 100 parts by mass of the raw material graphite particles. If the amount of the aromatic vinyl copolymer mixed is less than the lower limit, the dispersibility of the obtained fine graphite particles tends to be lowered. Meanwhile, if the amount of the aromatic vinyl copolymer mixed exceeds the upper limit, handling of the liquid tends to be difficult, because the aromatic vinyl copolymer is not dissolved in the solvent, and the viscosity of the liquid increases.

Moreover, the amount of the peroxyhydrate mixed is preferably 0.1 to 500 parts by mass, and more preferably 1 to 100 parts by mass, relative to 100 parts by mass of the raw material graphite particles. If the amount of the peroxyhydrate mixed is less than the lower limit, the dispersibility of the obtained fine graphite particles tends to be lowered. Meanwhile, if the amount of the peroxyhydrate mixed exceeds the upper limit, the electrical conductivity of the obtained fine graphite particles tends to be lowered, because the raw material graphite particles are excessively oxidized.

Next, the obtained mixture is subjected to a grinding treatment, so that the raw material graphite particles are ground into plate-like graphite particles by interlayer exfoliation. As a result, the aromatic vinyl copolymer adsorbs on the surfaces of the produced plate-like graphite particles. Hence, fine graphite particles can be obtained which are excellent in dispersion stability in the resin matrix according to the present invention or a solvent.

Examples of the grinding treatment according to the present invention include an ultrasonic wave treatment (the oscillation frequency is preferably 15 to 400 kHz, and the output power is preferably 500 W or less), a treatment using a ball mill, wet grinding, blasting, mechanical grinding, and the like. This grinding treatment makes it possible to grind the raw material graphite particles without destruction of the graphite structure of the raw material graphite particles to obtain the plate-like graphite particles. In addition, the temperature in the grinding treatment is not particularly limited, but may be −20 to 100° C., for example. Moreover, the grinding treatment time is not particularly limited, but may be 0.01 to 50 hours, for example.

The thus obtained fine graphite particles are in a state of being dispersed in the solvent, and can be collected by removing the solvent with filtration, centrifugation, or the like.

<Fibrous Inorganic Filler>

Next, the fibrous inorganic filler according to the present invention is described. The fibrous inorganic filler according to the present invention has thermal conductivity. When the fibrous inorganic filler having thermal conductivity is added, the fine graphite particles and the fibrous inorganic filler are in contact with each other to form a thermal conduction path in the resin composite material, so that the thermal conductivity of the resin composite material is improved. The single fiber thermal conductivity of such a fibrous inorganic filler is preferably 1 to 1000 W/(m·K), and more preferably 5 to 1000 W/(m·K). If the single fiber thermal conductivity of the fibrous inorganic filler is less than the lower limit, the fibrous inorganic filler itself acts as thermal resistance, and the improvement in thermal conductivity of the resin composite material is not achieved in some cases. Note that it tends to be difficult to obtain an appropriate fibrous filler having a single fiber thermal conductivity exceeding the upper limit.

Moreover, the fibrous inorganic filler according to the present invention preferably has electrical conductivity. When the fibrous inorganic filler having electrical conductivity is added, the fine graphite particles and the fibrous inorganic filler are in contact with each other to form an electrical conduction path in the resin composite material, so that the electrical conductivity of the resin composite material is improved. The electrical conductivity of such a fibrous inorganic filler is preferably $10^{-16}$ to $10^6$ S/cm, and more preferably 10 to $10^6$ S/cm. If the electrical conductivity of the fibrous inorganic filler is less than the lower limit, the fibrous inorganic filler itself acts as electrical resistance, and the improvement in electrical conductivity of the resin composite material is not achieved in some cases. Note that it tends to be difficult to obtain an appropriate fibrous filler having an electrical conductivity exceeding the upper limit.

Examples of such a fibrous inorganic filler include carbon nanotubes (single-walled or multi-walled), carbon fibers, silicon carbide whiskers, alumina fibers, BN fibers, glass fibers, titania fibers, zirconia fibers, Si—Ti—C—O fibers, gold-based fibers, silver-based fibers, iron-based fibers, copper-based fibers, vapor grown carbon fibers (VGCF), boron fibers, and the like. Of these fibrous inorganic fillers, carbon nanotubes (single-walled or multi-walled), silicon carbide whiskers, alumina fibers, gold-based fibers, and copper-based fibers are preferable, and carbon nanotubes (single-walled or multi-walled), silicon carbide whiskers, and alumina fibers are more preferable from the viewpoints of high thermal conductivity and high electrical conductivity.

An average fiber length of such a fibrous inorganic filler is preferably 0.1 to 100 μm, and more preferably 1 to 100 μm. If the average fiber length of the fibrous inorganic filler is less than the lower limit, it tends to be difficult to form a sufficient thermal conduction path or a sufficient electrical conduction path in the resin composite material, because the plural fine graphite particles in the dispersed state cannot be linked to each other. Meanwhile, if the average fiber length of the fibrous inorganic filler exceeds the upper limit, it tends to be difficult to disperse the fibrous inorganic filler.

In addition, the average fiber diameter of the fibrous inorganic filler is preferably 0.3 to 10000 nm, more preferably 0.3 to 1000 nm, particularly preferably 1 to 1000 nm, and most preferably 10 to 1000 nm. If the average fiber diameter of the fibrous inorganic filler is less than the lower limit, it tends to be unable to maintain the fibrous shape, because the fibrous inorganic filler easily snaps into pieces during a molding process. Meanwhile, if the average fiber diameter of the fibrous inorganic filler exceeds the upper limit, the fibrous inorganic filler tends not to link with the fine graphite particles readily, because the dispersibility of the fibrous inorganic filler is lowered.

Moreover, an average aspect ratio of the fibrous inorganic filler is preferably 10 to 1000, and more preferably 50 to 500. If the average aspect ratio of the fibrous inorganic filler is less than the lower limit, the fibrous inorganic filler tends not to link with the fine graphite particles readily, because the shape of the fibrous inorganic filler approaches a spherical shape. Meanwhile, if the average aspect ratio of the fibrous inorganic filler exceeds the upper limit, the dispersibility of the fibrous inorganic filler tends to be lowered, because of entanglement of the fibrous inorganic filler.

<Resin Matrix>

Next, the resin matrix according to the present invention is described. The resin matrix according to the present invention is not particularly limited, but examples thereof include thermoplastic commodity plastics such as polystyrene resin, polyethylene resin, polypropylene resin, and acrylic resin; thermoplastic engineering plastics such as polyphenylene ether resin, polyamide resin, polyacetal resin, polyethylene terephthalate resin, polybutylene terephthalate resin, and ultra-high-molecular-weight polyethylene resin; thermoplastic super engineering plastics such as polyamideimide resin, polyphenylene sulfide resin, polyether ether ketone resin, liquid crystal polymer resin, poly tetrafluoroethylene resin, polyetherimide resin, polyarylate resin, polysulfone resin, and polyimide resin; thermosetting resins such as epoxy resin, phenol resin, bismaleimide resin, melamine resin, polyurethane resin, and unsaturated polyester resin; and the like. One kind of these resins may be used alone, or two or more kinds thereof may be used in combination. In addition, of these resins, polystyrene resin, polyethylene resin, polypropylene resin, polyamide resin, polyamideimide resin, and polyphenylene sulfide resin are preferable from the viewpoints of versatility and mechanical properties.

<Resin Composite Material>

The resin composite material of the present invention comprises the fine graphite particles, the fibrous inorganic filler, and the resin matrix. In particular, a high elastic modulus can be imparted to the resin matrix by dispersing the fine graphite particles in the resin matrix.

Moreover, when the fine graphite particles and the fibrous inorganic filler are used in combination, the fine graphite particles and the fibrous inorganic filler are in contact with each other. As a result, plural fine graphite particles dispersed in the resin matrix are linked to each other through the fibrous inorganic filler, so that a thermal conduction path is formed in the resin composite material. Thus, the thermal conductivity of the resin composite material is improved.

Moreover, when the fibrous inorganic filler has electrical conductivity, the thermal conduction path functions also as an electrical conduction path. As a result, the electrical resistance of the resin composite material is reduced, and an excellent electrical conductivity can be imparted to the resin matrix.

The amounts of the fine graphite particles and the fibrous inorganic filler in such a resin composite material are not particularly limited, but are preferably as follows. Specifically, the amount of the fine graphite particles is preferably 0.1 to 90% by mass (more preferably 0.25 to 80% by mass and particularly preferably 1 to 80% by mass), whereas the amount of the fibrous inorganic filler is preferably 0.1 to 50% by mass (more preferably 1 to 30% by mass), relative to the entire resin composite material. Moreover, the total of these amounts is preferably 0.2 to 95% by mass (more preferably 0.26 to 95% by mass, particularly preferably 1 to 90% by mass, and most preferably 2 to 80% by mass), and the amount of the resin matrix is 5 to 99% by mass (more preferably 10 to 99% by mass and particularly preferably 20 to 98% by mass).

If any one of the amount of the fine graphite particles, the amount of the fibrous inorganic filler, and the total amount thereof is less than the lower limit, the thermal conductivity and the electrical conductivity of the resin composite material tend to be improved insufficiently, because the thermal conduction path and the electrical conduction path are not formed readily. In addition, if the amount of the fine graphite particles is less than the lower limit, the elastic modulus of the resin composite material also tends to decrease. Meanwhile, if the amount of the fine graphite particles exceeds the upper limit, a forming process tends to be difficult, because the surfaces of the fine graphite particles are not sufficiently wetted with the resin. Moreover, if the amount of the fibrous inorganic filler exceeds the upper limit, many boundaries between grains of the fibrous inorganic filler are present, and increase the grain boundary resistance. Hence, the thermal resistance and the electrical resistance of the resin composite material as a whole are increased, so that the thermal conductivity and the electrical conductivity tend to be lowered. Moreover, if the total amount of the fine graphite particles and the fibrous inorganic filler exceeds the upper limit, the surface of the fibrous inorganic filler is not sufficiently wetted with the resin, and formability and mechanical properties tend to be lowered.

Excellent thermal conductivity and high elastic moduli (storage elastic modulus and loss elastic modulus) can be imparted to the resin matrix in the resin composite material of the present invention by using the fine graphite particles and the fibrous inorganic filler in combination. For example, the thermal conductivity of the resin composite material of the present invention can be preferably 0.7 W/(m·K) or higher, and more preferably 5 W/(m·K) or higher. Moreover, the storage elastic modulus at 25° C. of the resin composite material of the present invention can be preferably 2 GPa or higher, and more preferably 5 GPa or higher.

Further, when a fibrous inorganic filler having electrical conductivity is used as the fibrous inorganic filler, electrical conductivity can also be improved. For example, the surface electrical resistance per unit length can be preferably 200Ω or lower, and more preferably 100Ω or lower.

The resin composite material of the present invention can be produced by, for example, mixing the fine graphite particles according to the present invention, the fibrous inorganic filler, and the resin matrix at a predetermined ratio. At this time, kneading (preferably melt kneading) may be employed, or mixing in a solvent may be employed. The solvent is not particularly limited, but a solvent exemplified as the solvents used for producing the fine graphite particles according to the present invention can be used.

When the fine graphite particles, the fibrous inorganic filler, and the resin matrix are mixed in the solvent, the resin matrix is dissolved in the solvent, and a uniform state is achieved. In addition, the fine graphite particles and the fibrous inorganic filler are highly dispersed in the solvent, and hence are more easily mixed with each other. As a result, a high and uniform dispersion liquid can be obtained easily. Moreover, by subjecting the obtained dispersion liquid to an ultrasonic wave treatment, the uniformity thereof tends to be further improved. Then, by removing the solvent from the thus obtained dispersion liquid, a resin composite material can be obtained in which the fine graphite particles and the fibrous inorganic filler are highly dispersed in the resin matrix.

EXAMPLES

Hereinafter, the present invention will be described more specifically on the basis of Examples and Comparative Examples. However, the present invention is not limited to Examples below. Note that the number average molecular weight (Mn) of each aromatic vinyl copolymer was measured by using a gel permeation chromatograph ("Shodex GPC101" manufactured by Showa Denko K. K.) under the following conditions.

<Conditions for Measurement of Aromatic Vinyl Copolymers>

Column: Shodex GPC K-805L and Shodex GPC K-800RL (both manufactured by Showa Denko K. K.)
Eluent: chloroform
Measuring temperature: 25° C.
Sample concentration: 0.1 mg/ml
Detection means: RI A value converted by using standard polystyrene is shown as the number average molecular weight (Mn) of each aromatic vinyl copolymer.

Preparation Example 1

36 g of styrene (ST), 4 g of N-phenylmaleimide (PM), 100 mg of azobisisobutyronitrile, and 50 ml of toluene were mixed, and a polymerization reaction was performed under a nitrogen atmosphere at 85° C. for 6 hours. After cooling, purification was performed by reprecipitation using chloroform-hexane. Thus, 25.6 g of an ST-PM (90:10) random copolymer (Mn=43000) was obtained.

7 g of graphite particles ("EXP-P" manufactured by Nippon Graphite Industries, ltd., particle diameters: 100 to 600 μm), 7 g of urea-hydrogen peroxide inclusion complex, 0.7 g of the ST-PM (90:10) random copolymer, and 300 ml of N,N-dimethylformamide (DMF) were mixed, and subjected to an ultrasonic wave treatment (output power: 250 W) at room temperature for 5 hours, Thus, a graphite particle-dispersed liquid was obtained. The graphite particle-dispersed liquid was allowed to stand still for 24 hours, and then visually observed. As a result, the graphite particles were not precipitated, and the obtained dispersion liquid was excellent in dispersion stability.

The fine graphite particles (FG) were collected by filtering the obtained graphite particle-dispersed liquid, and washing the filter cake with DMF, followed by vacuum drying. Observation of the fine graphite particles (FG) with a scanning electron microscope (SEM) showed that the fine graphite particles (FG) were plate-like fine graphite particles with lengths of 1 to 20 μm, widths of 1 to 20 μm, and thicknesses of 10 to 50 nm.

Examples 1 to 5

A polystyrene (PS, manufactured by Aldrich, weight average molecular weight: 170000), a multi-walled carbon nanotube (CNT, "VGCF-X" manufactured by Showa Denko K. K., average length: 3 μm, average diameter: 10 to 15 nm, average aspect ratio: 200 to 300), and the fine graphite particles (FG) prepared in Preparation Example 1 were mixed at each ratio shown in Tables 1 and 2, so that the total amount thereof was 5 g. Then, the material was dissolved or dispersed in 20 ml of chloroform. The obtained dispersion liquid was cast onto a Petri dish to form a film, and further subjected to vacuum drying for 12 hours to remove the chloroform. The obtained film was ground, and then kneaded by using a kneader (MINI LAB) at 180° C. for 5 minutes. Thus, resin composite materials (FG-CNT-PS) were obtained in which the fine graphite particles and the multi-walled carbon nanotube were dispersed in the polystyrene.

Comparative Example 1

A resin composite material (CNT-PS) in which the multi-walled carbon nanotube was dispersed in the polystyrene was obtained in the same manner as in Example 1, except that the fine graphite particles (FG) were not used, and the amount of the multi-walled carbon nanotube (CNT) was changed to 50% by mass.

Comparative Example 2

A resin composite material (EXP-CNT-PS) in which graphite particles and the multi-walled carbon nanotube were dispersed in the polystyrene was obtained in the same manner as in Example 1, except that 40% by mass of the graphite particles ("EXP-P" manufactured by Nippon Graphite Industries, ltd.), which were not fine, were used as they were instead of the fine graphite particles (FG).

Comparative Example 3

A resin composite material (CNT-PS) in which the multi-walled carbon nanotube was dispersed in the polystyrene was obtained in the same manner as in Example 3, except that the fine graphite particles (FG) were not used, and the ratio of the multi-walled carbon nanotube (CNT) was changed to 20% by mass.

Comparative Example 4

A resin composite material (FG-PS) in which the fine graphite particles were dispersed in the polystyrene was obtained in the same manner as in Example 3, except that the multi-walled carbon nanotube (CNT) was not used, and the ratio of the fine graphite particles (FG) was changed to 20% by mass.

Comparative Example 5 to 7

Resin composite materials (EXP-CNT-PS) in which the graphite particles and the multi-walled carbon nanotube were dispersed in the polystyrene were obtained in the same manners as in Examples 3 to 5, except that the graphite particles ("EXP-P" manufactured by Nippon Graphite Industries, ltd.), which were not fine, were used as they were instead of the fine graphite particles (FG), in each amount thereof as shown in Table 2.

Comparative Example 8

A resin composite material (EXP-PS) in which the graphite particles were dispersed in the polystyrene was obtained in the same manner as in Comparative Example 4, except that 20% by mass of the graphite particles (EXP-P), which were not fine, were used as they were instead of the fine graphite particles (FG).

<Thermal Conductivity>

A molded article having a thickness of 1 mm was prepared by subjecting the obtained resin composite material to press molding at 1.90° C. for 1 minute by using a hot press. Test Piece A of 10 mm square (thickness: 1 mm) was cut from the molded article, and the thermal diffusivity in the thickness direction of Test Piece A was measured by using a xenon flash analyzer ("LFA447 NanoFlash" manufactured by NETZSCH). After that, the specific heat capacity of this Test Piece A was measured by using a differential scanning calorimeter ("DSC-7" manufactured by PerkinElmer Inc.), and the thermal conductivity in the thickness direction of the molded article was determined according to the following formula by using the density of Test Piece A calculated from its volume and mass:

Thermal conductivity=Thermal diffusivity×Specific heat capacity×Density

Table 1 shows the results.

Moreover, a molded article having a thickness of 1 mm was prepared by press molding in the same manner as described above, and 10 small pieces with 10 mm in length×5 mm in width×1 mm in thickness were cut from the molded article. The 10 small pieces were adhered to one another by using an instant adhesive ("Aron Alpha" manufactured by TOAGOSEI CO., LTD.). Thus, a laminate of 10 mm in length×5 mm in width×10 mm in thickness was prepared. This laminate was cut along a plane perpendicular to the width direction to prepare Test Piece B of 10 mm in length×1 mm in width×10 mm in thickness. The thermal diffusivity in the width direction of Test Piece B was measured by using the above-described xenon flash analyzer. After that, the specific heat capacity of this Test Piece B was measured by using the differential scanning calorimeter, and the thermal conductivity in a plane direction of the molded article was determined according to the above-described formula by using the density of Test Piece B calculated from its volume and mass. Tables 1 and 2 show the results.

<Elastic Moduli>

Figure 3:
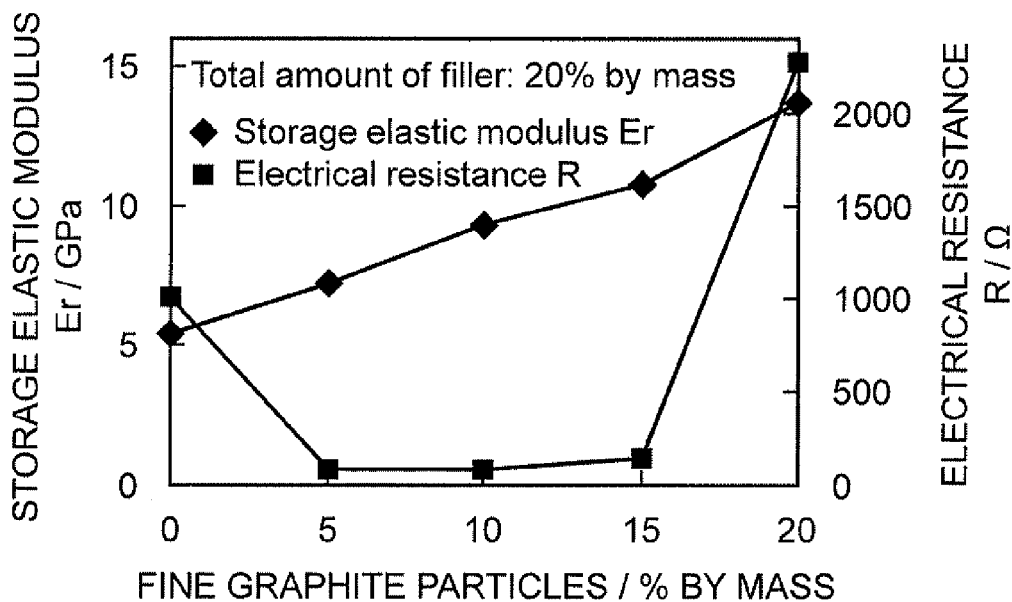
FIG. 3 is a graph showing the relationships between storage elastic modulus and the amount of fine graphite particles in a polystyrene resin composite material and between electrical resistance and the amount.

The obtained resin composite material was subjected to press molding using a hot press at 190° C. for 1 minute. Thus, Test Piece C of 30 mm in length×5 mm in width×0.5 mm in thickness was prepared. The elastic modulus of the obtained Test Piece C was measured by using a viscoelasticity spectrometer ("DVA-220" manufactured by IT Keisoku Seigyo Co., Ltd.), while the temperature was raised from room temperature to 160° C. at 5° C./minute, and vibrations were applied at 10 Hz. The storage elastic modulus and the loss elastic modulus at 25° C. of the Test Piece C were found from the obtained viscoelasticity spectrum. Table 2 shows the results. Moreover, FIG. 3 shows the relationship between the amount of the fine graphite particles and the storage elastic modulus (25° C.).

<Electrical Resistance>

Figure 4:
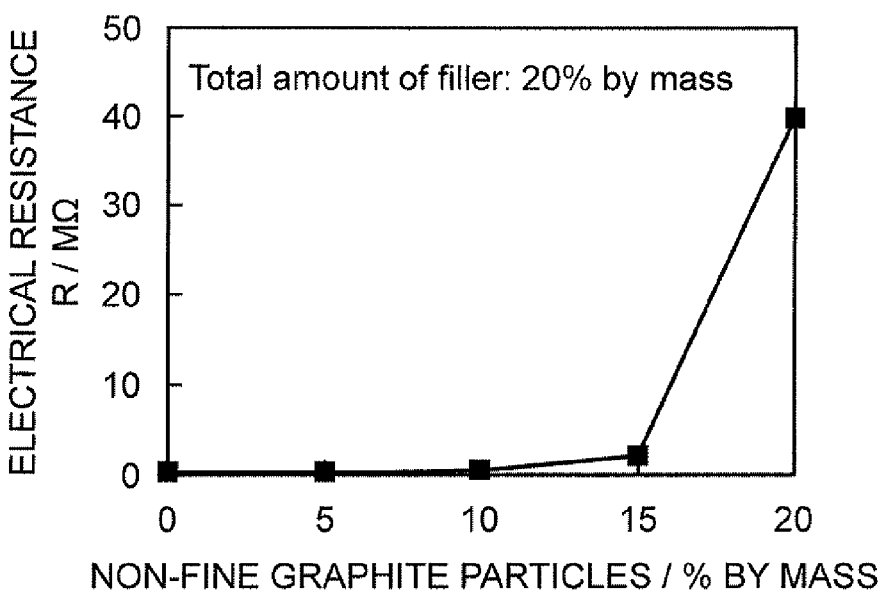
FIG. 4 is a graph showing the relationship between electrical resistance and the amount of non-fine graphite particles in a polystyrene resin composite material.

Probes of a tester ("CDM-09" manufactured by CUSTOM) were brought into contact with a surface of Test Piece C at a distance between the probes of 1 cm, and the value of the resistance one minute after stabilization was regarded as the electrical resistance of Test Piece C. Table 2 shows the results. In addition, FIG. 3 shows the relationship between the amount of the fine graphite particles and the electrical resistance, and FIG. 4 shows the relationship between the amount of the non-fine graphite particles and the electrical resistance.

in the resin composite materials (Examples 3 to 5) in which the fine graphite particles and the carbon nanotube were used in combination, as compared with that in the resin composite material (Comparative Example 3) in which the carbon nanotube alone was used and that in the resin composite material (Comparative Example 4) in which the fine graphite particles alone was used. From this result, it was found that the resin composite material of the present invention comprising the fine graphite particles and the carbon nanotube was excellent in electrical conductivity.

TABLE 1

|  | Resin matrix | | Filler | | | | Thermal conductivity (W/(m · K)) | |
| --- | --- | --- | --- | --- | --- | --- | --- | --- |
|  | Type | Amount (% by mass) | Type | Amount (% by mass) | Type | Amount (% by mass) | Plane direction | Thickness direction |
| Example 1 | PS | 50 | CNT | 10 | FG | 40 | 4.3 | 1.2 |
| Example 2 | PS | 25 | CNT | 5 | FG | 70 | 9.9 | 2.2 |
| Comp. Ex. 1 | PS | 50 | CNT | 50 | — | — | 1.5 | 0.57 |
| Comp. Ex. 2 | PS | 50 | CNT | 10 | EXP-P | 40 | 0.7 | 0.5 |

TABLE 2

|  | Resin matrix | | Filler | | | | Thermal conductivity (W/(m · K)) | | Storage elastic modulus | Loss elastic modulus | Electrical |
| --- | --- | --- | --- | --- | --- | --- | --- | --- | --- | --- | --- |
|  | Type | Amount (% by mass) | Type | Amount (% by mass) | Type | Amount (% by mass) | Plane direction | Thickness direction | Er (GPa) | Ei (GPa) | resistance R (Ω) |
| Comp. Ex. 3 | PS | 80 | CNT | 20 | — | — | 1.0 | 0.5 | 5.4 | 0.07 | 1000 |
| Example 3 | PS | 80 | CNT | 15 | FG | 5 | 1.4 | 0.7 | 7.2 | 0.15 | 77 |
| Example 4 | PS | 80 | CNT | 10 | FG | 10 | 2.1 | 0.9 | 9.3 | 0.23 | 81 |
| Example 5 | PS | 80 | CNT | 5 | FG | 15 | 1.0 | 0.4 | 10.8 | 0.34 | 140 |
| Comp. Ex. 4 | PS | 80 | — | — | FG | 20 | 0.8 | 0.3 | 13.7 | 0.59 | 2270 |
| Comp. Ex. 5 | PS | 80 | CNT | 15 | EXP-P | 5 | 0.22 | 0.18 | — | — | 4000 |
| Comp. Ex. 6 | PS | 80 | CNT | 10 | EXP-P | 10 | 0.27 | 0.22 | — | — | 120000 |
| Comp. Ex. 7 | PS | 80 | CNT | 5 | EXP-P | 15 | 0.28 | 0.23 | — | — | 2M |
| Comp. Ex. 8 | PS | 80 | — | — | EXP-P | 20 | 0.20 | 0.15 | — | — | 40M |

As is apparent from the results shown in Tables 1 and 2 and FIG. 3, it was found that, comparing between the case (each of Examples 1 and 3 to 5) where the fine graphite particles and the carbon nanotube together were combined with the polystyrene and the corresponding case (each of Comparative Examples 1 and 3) where the carbon nanotube alone was combined with the polystyrene in an amount equal to the total amount of the fine graphite particles and the carbon nanotube, the thermal conductivities in the plane direction and the thickness direction of the molded article in the former case (each of Examples 1 and 3 to 5) were equal or superior to that in the latter case (each of Comparative Examples 1 and 3), and the storage elastic modulus and the loss elastic modulus were higher in the former case (each of Examples 1 and 3 to 5) than in the latter case (each of Comparative Examples 1 and 3). Further, it was found from the viscoelasticity spectrum that such an effect of improving the storage elastic modulus was expressed at temperature from room temperature to around 100° C., which is just below the softening point of the polystyrene.

In addition, as is apparent from the results shown in Table 1, a comparison between Example 1 and Example 2 showed that the thermal conductivity in each of the plane direction and the thickness direction of the molded article was increased with the increase in the total amount of the fine graphite particles and the carbon nanotube.

Moreover, as is apparent from the results shown in Table 2 and FIG. 3, the electrical resistance was remarkably reduced Moreover, as is apparent from the results shown in Tables 1 and 2 and FIGS. 3 to 4, the thermal conductivities in each of the plane direction and the thickness direction of the molded article were increased and the electrical resistance was remarkably reduced in the resin composite materials (Examples 1 and 3 to 5) in which the fine graphite particles and the carbon nanotube were used in combination, as compared with those in the resin composite materials (Comparative Examples 2 and 5 to 7) in which the non-fine graphite particles and the carbon nanotube were used in combination. From this result, it was found that the thermal conductivity and the electrical conductivity were improved in the resin composite material of the present invention comprising the fine graphite particles and the carbon nanotube, as compared with those in the resin composite material in which the non-fine graphite particles and the carbon nanotube were used in combination.

As described above, according to the present invention, it is possible to provide a resin composite material comprising fine graphite particles and a fibrous inorganic filler and having excellent thermal conductivity and high elastic modulus. In particular, addition of a carbon nanotube as the fibrous inorganic filler makes it possible to provide a resin composite material excellent in electrical conductivity, in addition to the above characteristics.

Hence, the resin composite material of the present invention is useful in applications where high thermal conductivity and high elastic modulus are required, for example, useful as heat dissipation materials for automobiles, heater materials, and the like. In addition, the resin composite material comprising a carbon nanotube as the fibrous inorganic filler is useful in applications where high electrical conductivity is also required in addition to the above characteristics, for example, useful as electrical and electronic parts for automobiles (electrode materials and the like), and the like.

What is claimed is:

1. A resin composite material comprising:
fine graphite particles comprising
plate-like graphite particles having a thickness of 0.3 to 1000 nm, a length in a major axis direction of 0.1 to 500 μm, and a length in a minor axis direction of 0.1 to 500 μm, wherein the major and minor axis are in a plane, and
an aromatic vinyl copolymer which is adsorbed on the plate-like graphite particles and which contains a vinyl aromatic monomer unit represented by the following formula (1):

  (1)

in the formula (I), X represents a phenyl group, a naphthyl group, an anthracenyl group, or a pyrenyl group, provided that these groups may have each a substituent, a fibrous inorganic filler; and
a resin matrix.

2. The resin composite material according to claim 1, wherein
the fine graphite particles are obtained by subjecting graphite particles to a grinding treatment in the presence of a peroxyhydrate and the aromatic vinyl copolymer.

3. The resin composite material according to claim 1, wherein
the fibrous inorganic filler is at least one selected from the group consisting of carbon nanotubes, carbon fibers, silicon carbide whiskers, and alumina fibers.

4. The resin composite material according to claim 1, wherein
the fibrous inorganic filler has an average fiber length of 0.1 to 100 μm.

5. The resin composite material according to claim 1, wherein
the fibrous inorganic filler has an average fiber diameter of 0.3 to 1000 nm.

6. The resin composite material according to claim 1, wherein
an amount of the fine graphite particles is 0.1 to 90% by mass, an amount of the fibrous inorganic filler is 0.1 to 50% by mass, and a total amount of the fine graphite particles and the fibrous inorganic filler is 0.2 to 95% by mass, relative to the entire resin composite material.

7. The resin composition material according to claim 1, wherein
another monomer unit constituting the aromatic vinyl copolymer is a monomer unit derived from at least one monomer selected from the group consisting of (meth)acrylic acid, (meth)acrylates, (meth)acrylamides, vinylamidazoles, vinylpryidines, maleic anhydride, and maleimides.

8. The resin composition material according to claim 1, wherein
an amount of the vinyl aromatic monomer unit is 10 to 98% by mass relative to the entire aromatic vinyl copolymer.

* * * * *